United States Patent
Yanagisawa et al.

(10) Patent No.: US 7,321,403 B2
(45) Date of Patent: Jan. 22, 2008

(54) VIDEO SIGNAL TRANSMITTING/RECEIVING SYSTEM

(75) Inventors: Ryogo Yanagisawa, Osaka (JP); Tadahiro Yoshida, Osaka (JP); Satoshi Takahashi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 551 days.

(21) Appl. No.: 11/020,046

(22) Filed: Dec. 23, 2004

(65) Prior Publication Data

US 2005/0104876 A1 May 19, 2005

(51) Int. Cl.
H04N 5/38 (2006.01)
H04N 5/04 (2006.01)

(52) U.S. Cl. .................. 348/723; 348/500; 375/371; 370/517

(58) Field of Classification Search ............. 348/723, 348/497, 500, 536, 537, 388.1; 370/508, 370/509, 512, 516, 517, 519; 375/371, 373
See application file for complete search history.

(56) References Cited

U.S. PATENT DOCUMENTS

| | | | | |
|---|---|---|---|---|
| 4,020,282 A | * | 4/1977 | Halpern ................... | 375/254 |
| 5,150,201 A | * | 9/1992 | Mehrgardt et al. ........ | 348/662 |
| 6,031,847 A | * | 2/2000 | Collins et al. ............ | 370/508 |
| 6,914,637 B1 | * | 7/2005 | Wolf et al. ................ | 348/473 |
| 6,915,462 B1 | * | 7/2005 | Davis et al. .............. | 714/700 |
| 7,123,660 B2 | * | 10/2006 | Haq et al. ................ | 375/257 |
| 2003/0149987 A1 | | 8/2003 | Pasqualino et al. | |

FOREIGN PATENT DOCUMENTS

| | | |
|---|---|---|
| JP | 5-37580 | 2/1993 |
| JP | 11-112485 | 4/1999 |
| JP | 2001-44976 | 2/2001 |
| JP | 2001-268390 | 9/2001 |
| WO | WO 97/48056 | 12/1997 |

OTHER PUBLICATIONS

Japanese Office Action (with English Translation) issued in Japanese Patent Application No. JP 2002-326480, dated Sep. 18, 2007.

* cited by examiner

*Primary Examiner*—M. Lee
(74) *Attorney, Agent, or Firm*—McDermott Will & Emery LLP

(57) ABSTRACT

In a transmitting section for a video signal transmitting/receiving system for transmitting digital video signals using a plurality of transmission channels, video guard band signals are inserted into video signals associated with the transmission channels immediately before transition from a blanking region to an effective video region. In a receiving section for the system, the inserted video guard band signals are detected for the respective transmission channels. A skew among the transmission channels is detected based on the detection result. To synchronize the video guard band signals among all the transmission channels, with reference to one of the video signals associated with a transmission channel with the longest delay (i.e., delayed by one clock cycle 1T), a delay of 1T is given to the other video signals. As a result, even if a skew occurs among the transmission channels, correct pixel data is displayed.

8 Claims, 10 Drawing Sheets

EFFECTIVE VIDEO REGION
 HORIZONTAL BLANKING REGION
 VERTICAL BLANKING REGION

VIDEO SIGNAL TRANSMITTING/RECEIVING SYSTEM

CROSS-REFERENCE TO RELATED APPLICATION

This Non-provisional application claims priority under 35 U.S.C.§119(a) on Patent Application No. 2002-326480 filed in Japan on Nov. 11, 2002, the entire contents of which are hereby incorporated by reference.

BACKGROUND OF THE INVENTION

The present invention relates to video signal transmitting/receiving systems for transmitting and receiving digital video signals.

In recent years, as typified by the digital visual interface (DVI) standard, signal transmitting/receiving systems for performing video-signal transmission and reception between video sources and video monitors using uncompressed digital signals, i.e., baseband digital video signals, have been developed.

In conventional video signal transmitting/receiving systems, as disclosed in International Publication No. WO97/48056, when digital video signals are transmitted from a transceiver to a receiver via signal lines associated with a plurality of transmission channels, the receiver reproduces received digital video signals based on the assumption that the video signals are synchronized with each other among the transmission channels.

Hereinafter, a conventional video signal transmitting/receiving system will be described. FIG. 5 is a block diagram showing the conventional video signal transmitting/receiving system. In FIG. 5, reference numeral 1 denotes a transmitting section and reference numeral 2 denotes a receiving section. These sections 1 and 2 are connected to each other via three signal lines 3a through 3c such that video signals associated with three transmission channels are transmitted. The transmitting section 1 includes three transmitters 1a through 1c and three video signal generators 6a through 6c associated with the respective transmission channels 0, 1 and 2. The receiving section 2 includes three receivers 2a through 2c associated with the respective transmission channels 0, 1 and 2.

FIG. 6 schematically shows a video signal region of a signal transmitted and associated with each of the transmission channels 0, 1 and 2. The video signal region is a video signal region in the video format of 720×480 pixels, for example. In FIG. 6, the video signal region is divided into a horizontal blanking region, a vertical blanking region and an effective video region. The video signal generators 6a through 6c generate control signals for video display during a blanking period and generate video signals during an effective video period. A display monitor (not shown) sequentially displays video data received in the effective video region.

However, the above conventional configuration is based on the assumption that no skews occur in signal transmission among the transmission channels. Therefore, if a skew occurs in transmission channels resulting from an error in the lengths of signal paths, a delay of an internal clock signal or others in a transmitting/receiving system, correct video data is not displayed in actual use. Hereinafter, this problem will be described in detail.

FIGS. 7A and 7B are timing charts showing video signals in an RGB transmission mode using three channels. In FIGS. 7A and 7B, the transmission channel 0 corresponds to a luminance signal for "Blue", the transmission channel 1 corresponds to a luminance signal for "Green" and the transmission channel 2 corresponds to a luminance signal for "Red". Reference signs R0, R1, R2, . . . denote luminance data in respective pixels 0, 1, 2, . . . Reference sign CS denotes control signals for display control. FIG. 7A shows a case where no skews occur among the transmission channels. In this case, video signals are transmitted in synchronization with a video clock signal for all the transmission channels. FIG. 7B shows a case where a skew corresponding to one clock cycle of a video clock signal occurs on one transmission channel 1 out of the transmission channels 0 through 2.

In FIG. 7B, a skew corresponding to one clock cycle occurs on the transmission channel 1. Accordingly, in the pixel 1 in which luminance data B1, G1 and R1 are displayed in the case of FIG. 7A, for example, luminance data B1 and R1 and luminance data G0, which is luminance data for the pixel 0, are combined and displayed in the case of FIG. 7B. That is, correct pixel data is not obtained in the case of FIG. 7B.

SUMMARY OF THE INVENTION

It is therefore an object of the present invention to provide a video signal transmitting/receiving system capable of displaying correct video data even when a skew occurs in signal transmission among a plurality of transmission channels.

In order to achieve this object, according to the present invention, the boundary between a blanking region and an effective region in a digital video signal transmitted to a receiving section is detected for each transmission channel, and it is determined how the boundary differs among transmission channels. Then, for each transmission channel, a video signal is delayed by a period corresponding to the amount of the difference in boundary so that the phases of video signals are coincide with each other for all the transmission channels. In this manner, occurrence of a skew is avoided.

Specifically, a video signal transmitting/receiving system according to the present invention is a video signal transmitting/receiving system in which a video signal region is made of an effective video region and a blanking region, the effective video region includes pixel signals, the blanking region includes control signals for display control, and the pixel signals and the control signals constitute a digital video signal. The video signal transmitting/receiving system transmits and receives the digital video signal via a plurality of transmission channels. The video signal transmitting/receiving system includes: a transmitting section for transmitting the digital video signal; a receiving section for receiving the digital video signal; and a plurality of communication lines associated with the respective transmission channels and connecting the transmitting section and the receiving section to each other. The transmission section includes video-guard-band-signal inserting circuits for inserting video guard band signals into the respective transmission channels immediately before transition from the blanking region to the effective video region. The receiving section includes, for each of the transmission channels, a signal path for outputting a received digital video signal without a delay, and a delay path for delaying the received digital video signal in synchronization with a clock signal, and further includes a video-guard-band-signal detector for detecting the video guard band signals inserted into the respective transmission channels by the video-guard-band-signal inserting circuits. The video-guard-band-signal detector selects either the signal path or the delay path for each of the transmission channels, based on the detection of an associated one of the video guard band signals.

In one embodiment of the above video signal transmitting/receiving system, the digital video signal conforms to an HDMI standard in which the control signals for display control and audio signals are included in the blanking region.

Another video signal transmitting/receiving system according to the present invention is a video signal transmitting/receiving system in which a video signal region is made of an effective video region and a blanking region, the effective video region includes pixel signals, the blanking region includes control signals for display control, and the pixel signals and the control signals constitute a digital video signal. The video signal transmitting/receiving system transmits and receives the digital video signal via a plurality of transmission channels. The video signal transmitting/receiving system includes: a transmitting section for transmitting the digital video signal; a receiving section for receiving the digital video signal; and a plurality of communication lines associated with the respective transmission channels and connecting the transmitting section and the receiving section to each other. The receiving section includes, for each of the transmission channels, a signal path for outputting a received digital video signal without a delay, and a delay path for delaying the received digital video signal in synchronization with a clock signal, and further includes an effective video boundary detector for detecting a boundary of transition from the blanking region to the effective video region, for each of the transmission channels. The effective video boundary detector selects either the signal path or the delay path for each of the transmission channels, based on the detection of the boundary.

In one embodiment of the above video signal transmitting/receiving system, the digital video signal conforms to a DVI standard in which only the control signals for display control are included in the blanking region.

A video signal transmitting/receiving system according to the present invention is a video signal transmitting/receiving system in which a video signal region is made of an effective video region and a blanking region, the effective video region includes pixel signals, the blanking region includes control signals for display control, and the pixel signals and the control signals constitute a digital video signal. The video signal transmitting/receiving system transmits and receives the digital video signal via a plurality of transmission channels. The video signal transmitting/receiving system includes: a transmitting section for transmitting the digital video signal; a receiving section for receiving the digital video signal; and a plurality of communication lines associated with the respective transmission channels and connecting the transmitting section and the receiving section to each other. The transmission section includes video-guard-band-signal inserting circuits for inserting video guard band signals into the respective transmission channels immediately before transition from the blanking region to the effective video region. The receiving section includes, for each of the transmission channels, a first holder for holding a received control signal or pixel signal for a given period corresponding to at least three clock cycles, a second holder for holding, for the given period, a control signal or pixel signal subsequent to the control signal or pixel signal held by the first holder, and a third holder for holding, for the given period, a control signal or pixel signal subsequent to the control signal or pixel signal held by the second holder. The receiving section further includes a video-guard-band-signal detector for detecting the video guard band signals inserted into the respective transmission channels by the video-guard-band-signal inserting circuits. The video-guard-band-signal detector selects one of the first, second and third holders for each of the transmission channels, based on the detection of an associated one of the video guard band signals.

In one embodiment of the above video signal transmitting/receiving system, the digital video signal conforms to an HDMI standard in which the control signals for display control and audio signals are included in the blanking region.

A video signal transmitting/receiving system according to the present invention is a video signal transmitting/receiving system in which a video signal region is made of an effective video region and a blanking region, the effective video region includes pixel signals, the blanking region includes control signals for display control, and the pixel signals and the control signals constitute a digital video signal. The video signal transmitting/receiving system transmits and receives the digital video signal via a plurality of transmission channels. The video signal transmitting/receiving system includes: a transmitting section for transmitting the digital video signal; a receiving section for receiving the digital video signal; and a plurality of communication lines associated with the respective transmission channels and connecting the transmitting section and the receiving section to each other. The receiving section includes, for each of the transmission channels, a first holder for holding a received control signal or pixel signal for a given period corresponding to at least three clock cycles, a second holder for holding, for the given period, a control signal or pixel signal subsequent to the control signal or pixel signal held by the first holder, and a third holder for holding, for the given period, a control signal or pixel signal subsequent to the control signal or pixel signal held by the second holder. The receiving section further includes an effective video boundary detector for detecting a boundary of transition from the blanking region to the effective video region for each of the transmission channels. The effective video boundary detector selects one of the first, second and third holders for each of the transmission channels, based on the detection of the boundary.

In one embodiment of the above video signal transmitting/receiving system, the digital video signal conforms to a DVI standard in which only the control signals for display control are included in the blanking region.

With the foregoing configurations, according to the present invention, in the receiving section, an inserted video guard band signal or the boundary of transition from the blanking region to the effective video region is detected for each transmission channel, and the phase of a video signal is adjusted depending on each transmission channel. Accordingly, even when a skew occurs in signal transmission among a plurality of transmission channels, with reference to the timing of outputting a received video signal associated with a transmission channel with the longest delay, the output timings of the received video signals associated with the other transmission channels are delayed. As a result, the skew occurring among the transmission channels is eliminated, thus enabling display of correct video data.

DESCRIPTION OF THE PREFERRED EMBODIMENTS

Hereinafter, embodiments of the present invention will be described with reference to the drawings.

Embodiment 1

Figure 1:
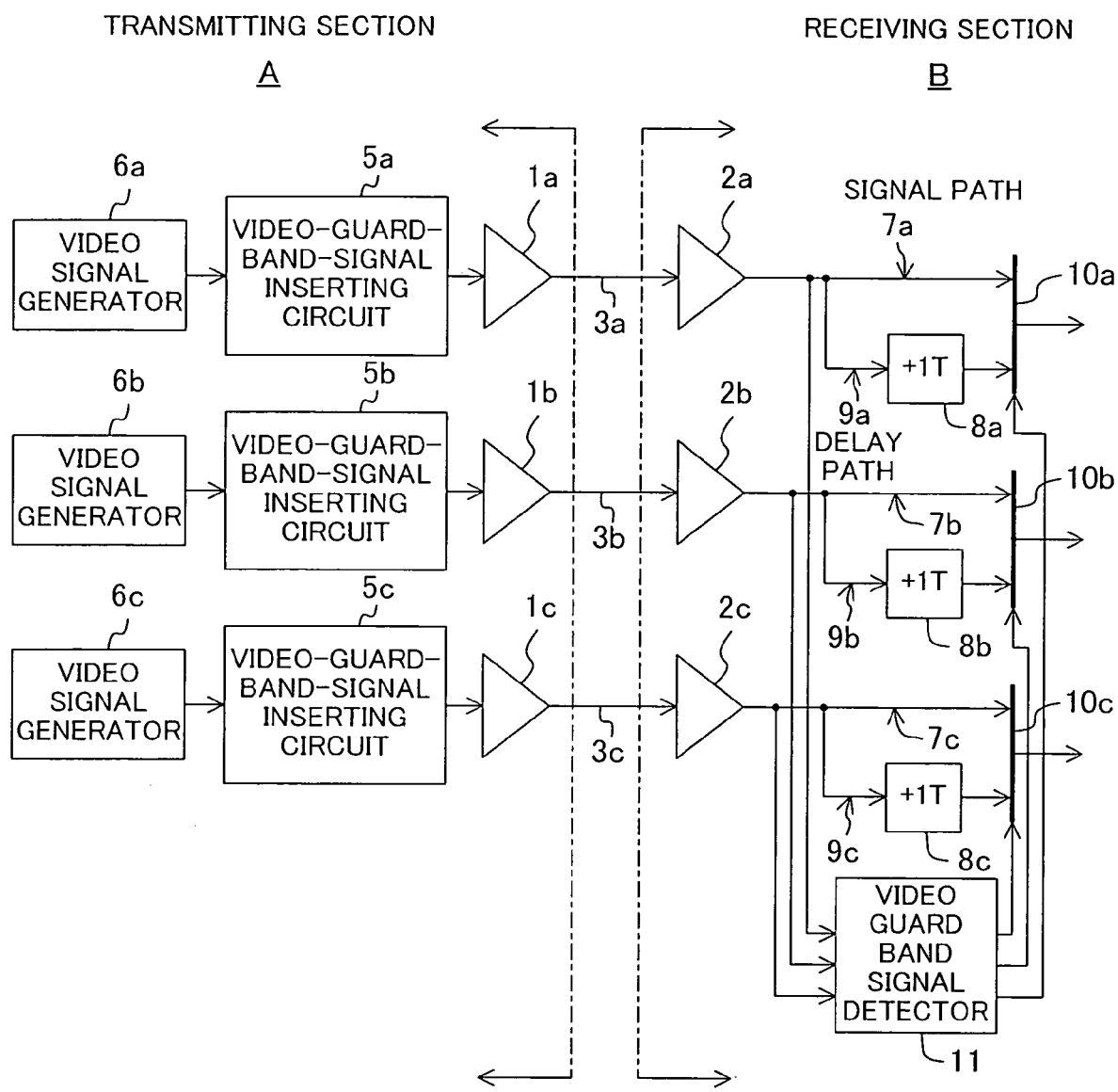
FIG. 1 is a block diagram showing an entire configuration of a video signal transmitting/receiving system according to a first embodiment of the present invention.

FIG. 1 is a block diagram showing a configuration of a video signal transmitting/receiving system according to a first embodiment of the present invention. In this embodiment, a video signal transmitting/receiving system in an RGB transmission mode using three channels will be described.

Figure 7A:
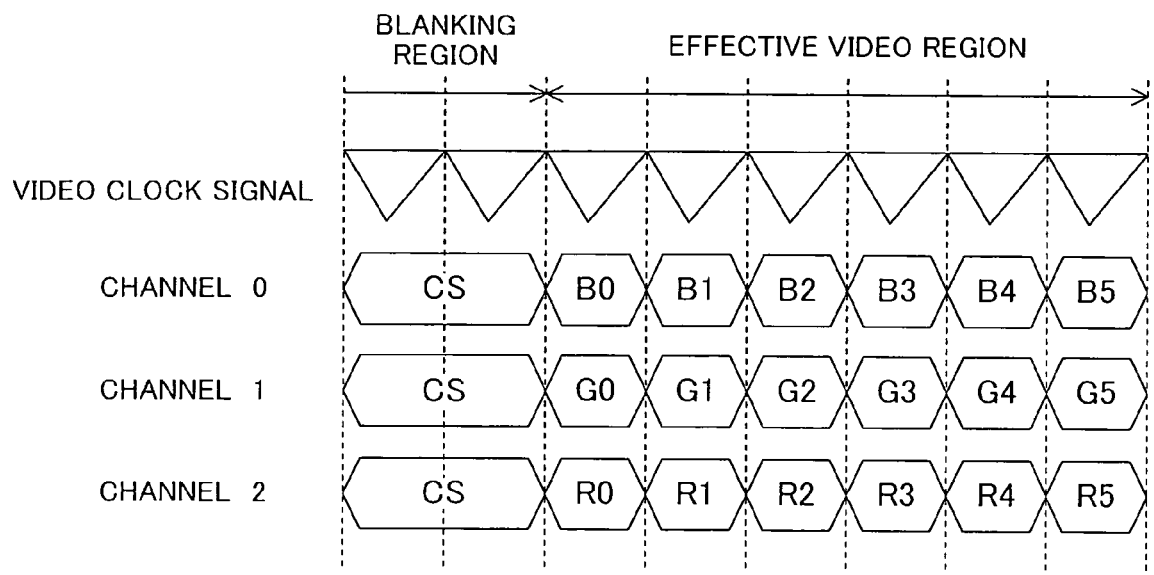
FIG. 7A is a timing chart showing video signals associated with respective transmission channels in a case where an RGB transmission mode using three channels is adopted in the video signal transmitting/receiving system and no skews occur among the video signals.

In FIG. 1, reference character A denotes a transmitting section and reference character B denotes a receiving section. These sections A and B are connected to each other via three signal lines 3a through 3c such that video signals associated with three transmission channels are transmitted. The transmitting section A includes: three video signal generators 6a through 6c associated with transmission channels 0, 1 and 2; and three transmitters 1a through 1c for transmitting, to the signal lines 3a through 3c, digital video signals generated from the video signal generators 6a through 6c and associated with the respective transmission channels. The video signal generators 6a through 6c conform to the high definition multimedia interface (HDMI) standard. Specifically, the video signal generators 6a through 6c output control signals for video display and audio signals in synchronization with and included in picture data in the vertical blanking region and the horizontal blanking region shown in FIG. 7, and output video signals in the effective video region shown in FIG. 7.

Figure 6:
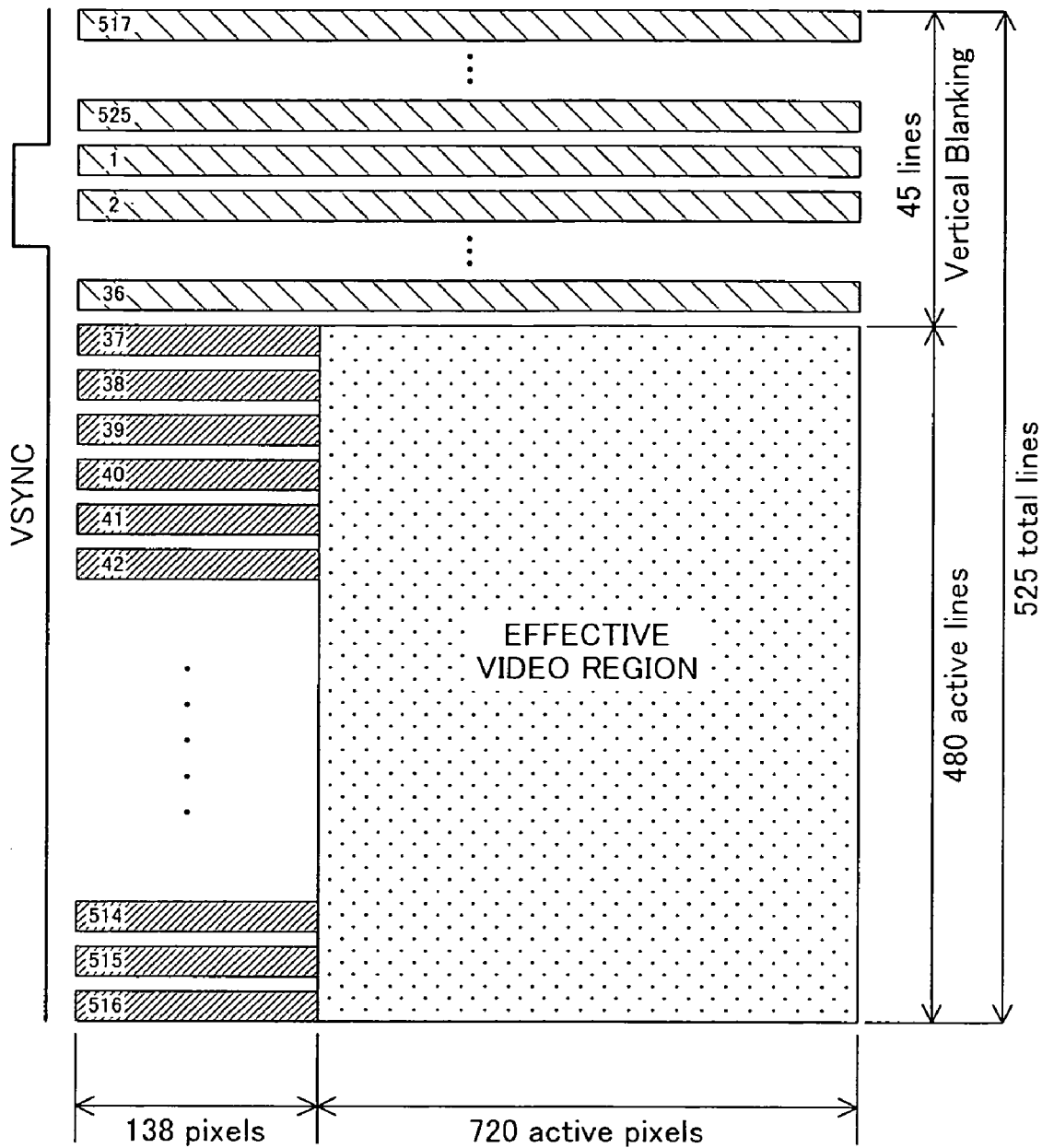
FIG. 6 is a diagram showing a video signal region in the format of 720×480 pixels.
Figure 6:
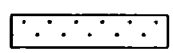
Figure 6:
Figure 6:

Video-guard-band-signal inserting circuits 5a through 5c associated with the three transmission channels are respectively placed between the video signal generators 6a through 6c and the associated transmitters 1a through 1c. As shown in FIG. 6, the video-guard-band-signal inserting circuits 5a through 5c insert video guard band signals VGB immediately before transition from the horizontal blanking region to the effective video region. These video guard band signals VGB will be described later.

On the other hand, the receiving section B includes: three receivers 2a through 2c associated with the respective transmission channels 0, 1 and 2. The outputs of the receivers 2a through 2c are respectively connected to signal paths 7a through 7c for transmitting received video signals to the next stage without change. The outputs of the receivers 2a through 2c are also connected to delay paths 9a through 9c provided in parallel with the signal paths 7a through 7c and including respective delay circuits 8a through 8c each for delaying a received video signal by a given number of cycles (e.g., one cycle 1T in FIG. 1) of a video clock signal. The receivers 2a through 2c are connected to selectors 10a through 10c each for selecting either an associated one of the signal paths 7a through 7c or an associated one of the delay paths 9a through 9c connected to the outputs of the receivers 2a through 2c. Video signals selected by the selectors 10a through 10c are transmitted to the next stage.

The receiving section B includes a video-guard-band-signal detector 11. The video-guard-band-signal detector 11 detects video guard band signals VGB included in video signals associated with transmission channels and received by the respective receivers 2a through 2c, and controls operation of the selectors 10a through 10c based on the detection (detection timings) of the video guard band signals VGB for the three transmission channels.

Now, operation of the video signal transmitting/receiving system, especially operation of the video-guard-band-signal detector 11, will be described.

Figure 2A:
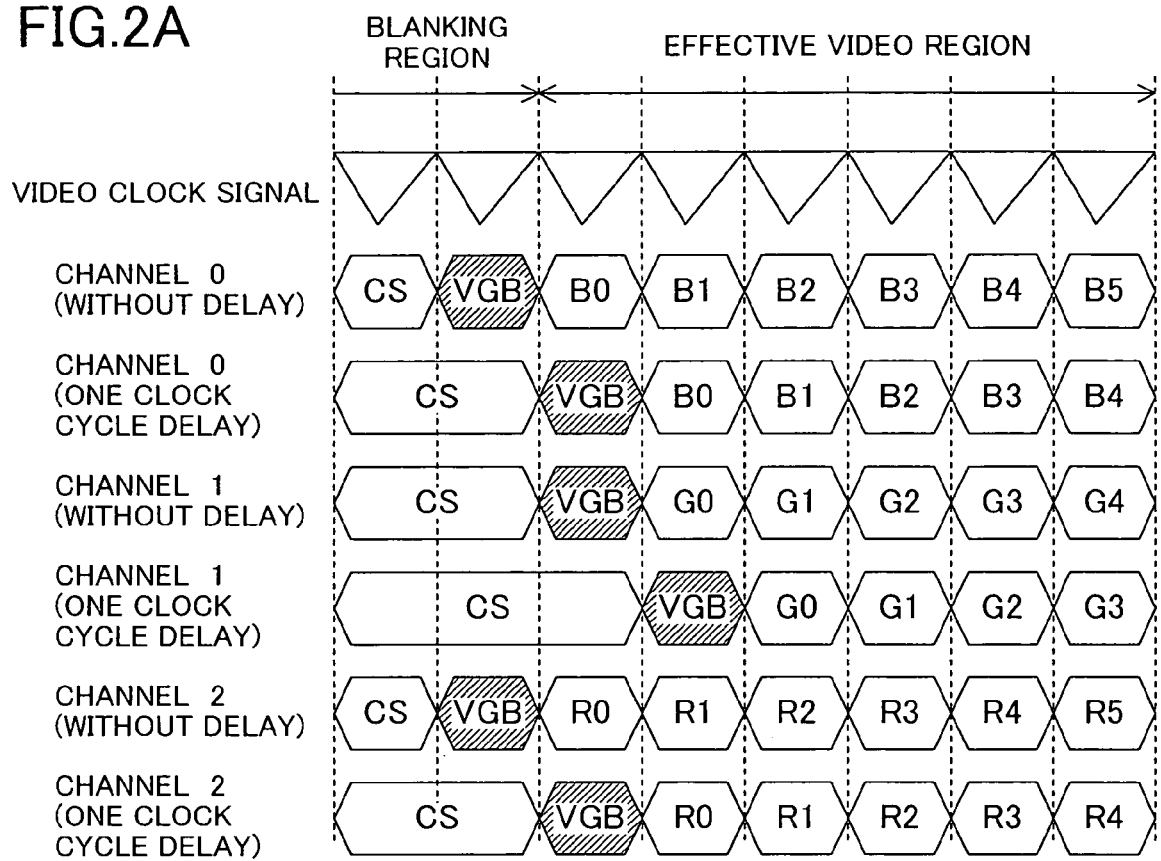
FIG. 2A is a timing chart showing video signals associated with respective transmission channels in a case where an RGB transmission mode using three channels is adopted in the video signal transmitting/receiving system.
Figure 2B:
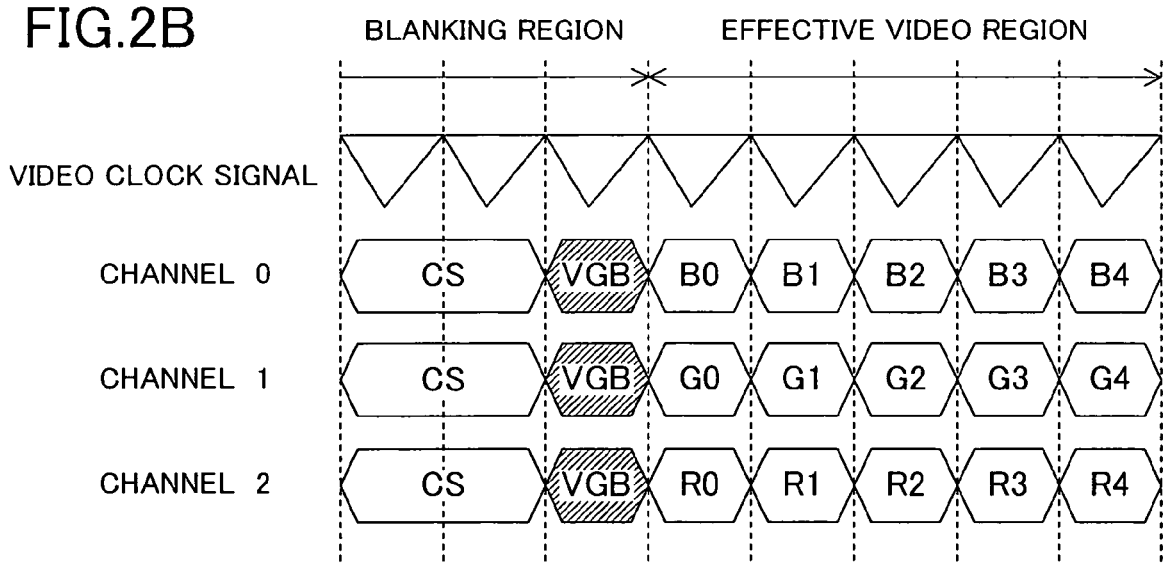
FIG. 2B is a timing chart showing video signals associated with the respective transmission channels in a case where skews are eliminated.

First, in the transmitting section A, the video-guard-band-signal inserting circuits 5a through 5c insert respective video guard band signals VGB into video signals immediately before transition from the blanking region to the effective video region. Accordingly, as shown in FIGS. 2A and 2B, a video guard band signal VGB is present between a control signal CS and a video signal B0, G0 or R0 in each of the video signals associated with the three transmission channels to be transmitted to the three signal lines 3a through 3c. It should be noted that FIGS. 2A and 2B show an example in which not audio signals but control signals CS are output in a period corresponding to the horizontal blanking region immediately before the effective video region.

Figure 7B:
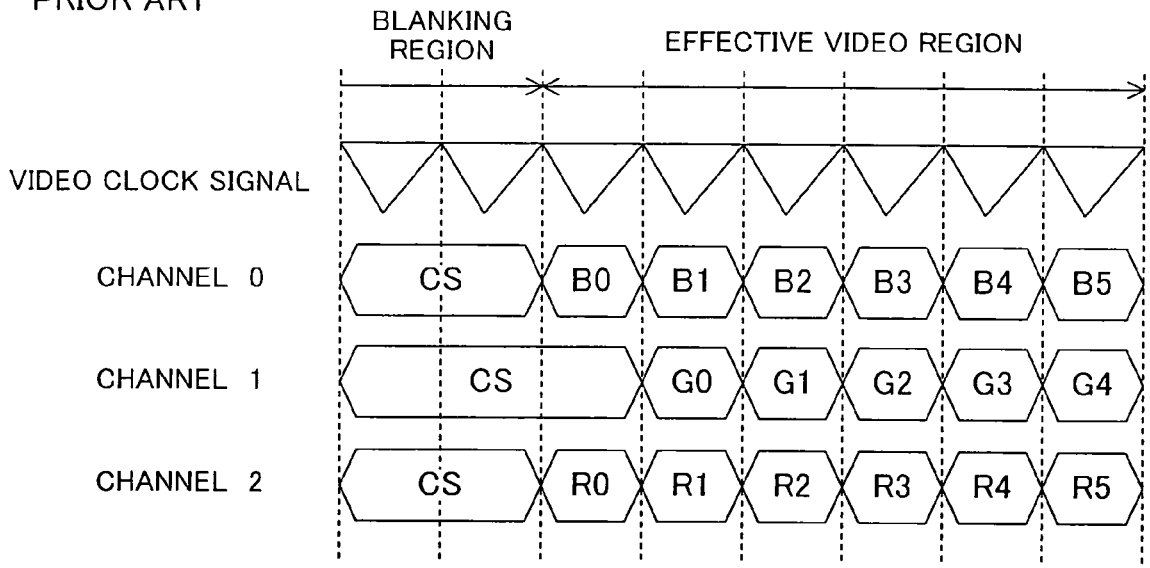
FIG. 7B is a timing chart showing video signals associated with the respective transmission channels in a case where a skew occurs among the video signals.

On the other hand, as shown in FIG. 2A, the receivers 2a, 2b and 2c output received video signals through the signal paths 7a through 7c without a delay and output received video signals with a delay corresponding to one clock cycle of a video clock signal through the delay paths 9a through 9c. As FIG. 7B, FIG. 2A shows a case where a skew corresponding to one clock cycle occurs on the transmission channel 1.

As shown in FIG. 2A, to bring video guard band signals VGB associated with the transmission channels 0 through 2 into synchronization, it is sufficient that a video signal delayed by one clock cycle through the delay path 9a is selected on the transmission channel 0, a video signal transmitted through the signal path 7b without a delay is selected on the transmission channel 1, and a video signal delayed by one clock cycle through the delay path 9c is selected on the transmission channel 2.

The video-guard-band-signal detector 11 controls the selectors 10a through 10c such that the selectors 10a through 10c select video signals obtained when all the video guard band signals VGB for the transmission channels 0 through 2 are synchronized with each other. Specifically, a video signal transmitted through the delay path 9a is selected on the transmission channel 0, a video signal transmitted through the signal path 7b is selected on the transmission channel 1, and a video signal transmitted through the delay path 9c is selected on the transmission channel 2. As a result, as shown in FIG. 2B, the receiving section B outputs video signals delayed by one clock cycle for the transmission channels 0 through 2, and all the data for B1, G1 and R1 in the pixel 1, for example, are synchronized with each other, so that correct luminance data is displayed.

Embodiment 2

Now, a video signal transmitting/receiving system according to a second embodiment of the present invention will be described with reference to FIG. 3.

Figure 3:
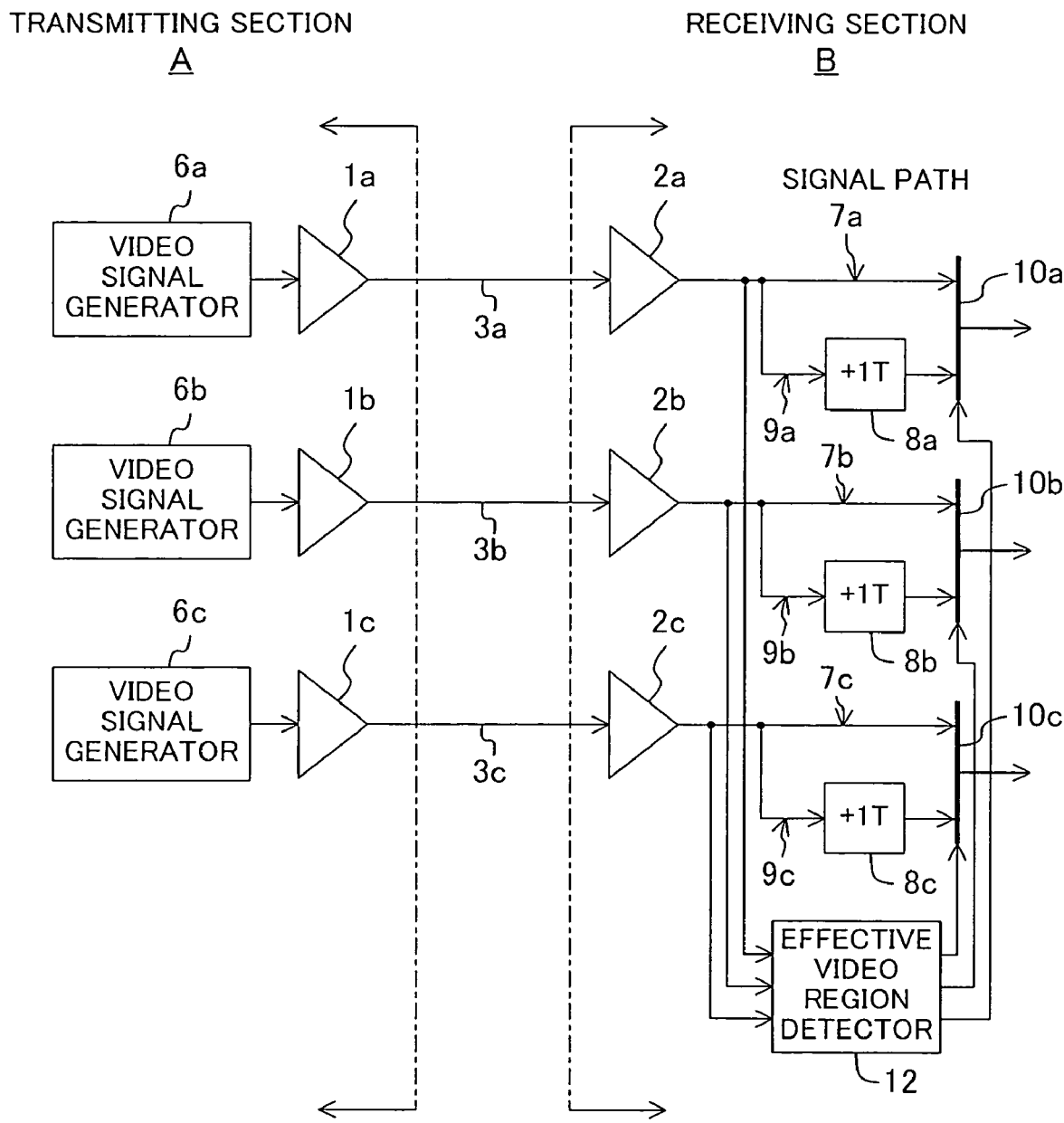
FIG. 3 is a block diagram showing an entire configuration of a video signal transmitting/receiving system according to a second embodiment of the present invention.

FIG. 3 shows the video signal transmitting/receiving system of the second embodiment. The video signal transmitting/receiving system shown in FIG. 3 is different from that shown in FIG. 1 in the configuration of video signal generators 6a through 6c included in a transmitting section A, and in that the video-guard-band-signal inserting circuits 5a through 5c are omitted in the transmitting section A, and that an effective video region detector 12 is provided in a receiving section B.

In the video signal region shown in FIG. 6, the video signal generators 6a through 6c conform to the DVI standard. Specifically, only control signals CS for video display are generated and output in the vertical and horizontal blanking regions and audio signals are not included in picture data for display.

The effective video region detector 12 in the receiving section B receives video signals associated with respective transmission channels and received by receivers 2a through 2c, and detects the timing of transition from the horizontal blanking region to the effective video region in each of the video signals. Since the video signal generators 6a through 6c generate only control signals CS in the horizontal blanking region, the timing of transition to the effective video region is easily detected only by distinguishing the control signals from pixel signals even in the absence of video guard band signals VGB, unlike the first embodiment.

Figure 4A:
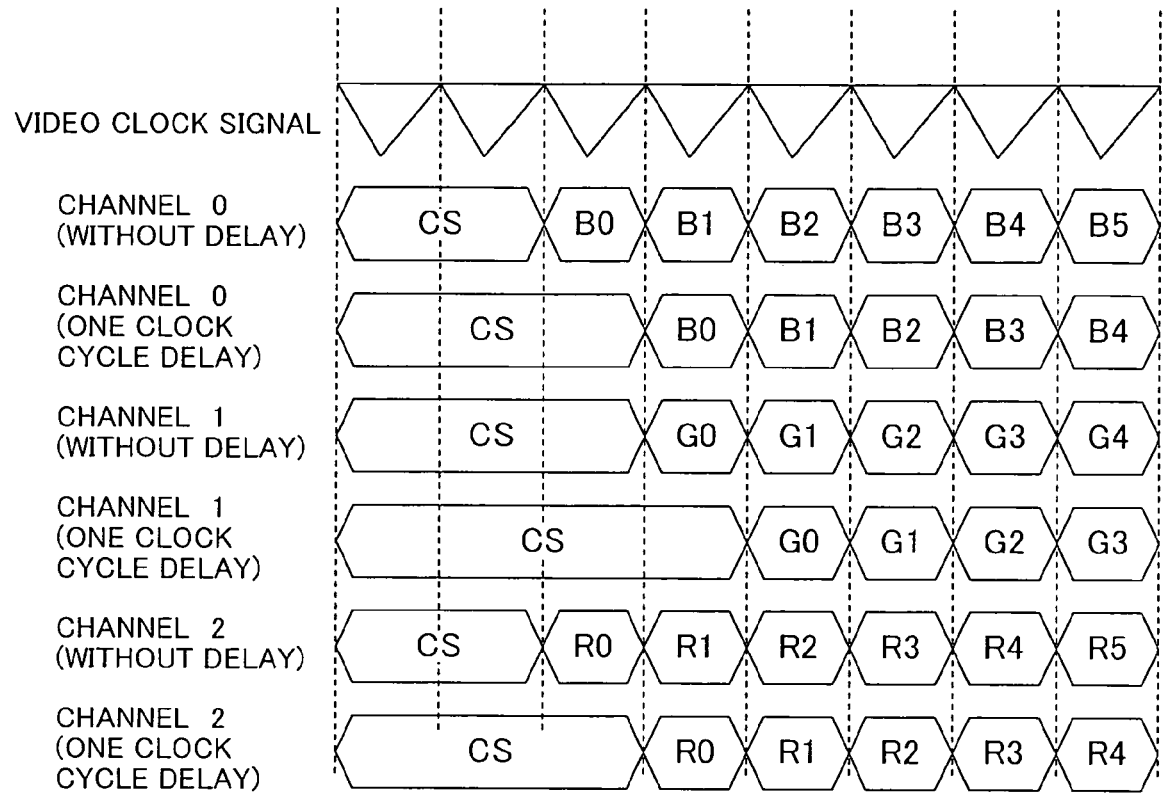
FIG. 4A is a timing chart showing video signals associated with respective transmission channels in a case where an RGB transmission mode using three channels is adopted in the video signal transmitting/receiving system.
Figure 4B:
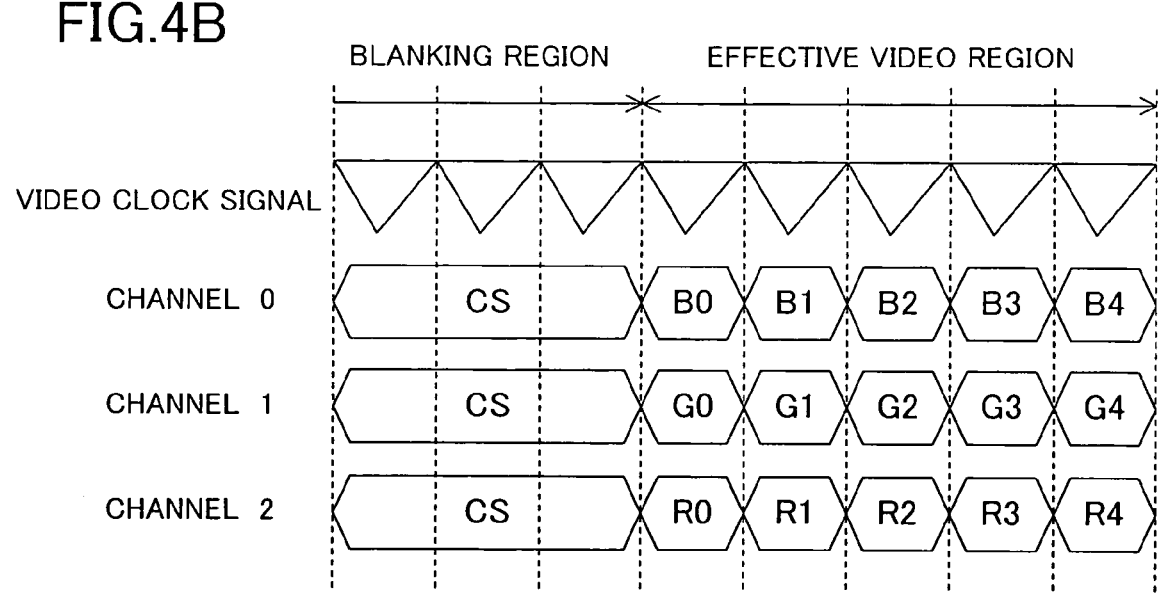
FIG. 4B is a timing chart showing video signals associated with the respective transmission channels in a case where skews are eliminated.
Figure 5:
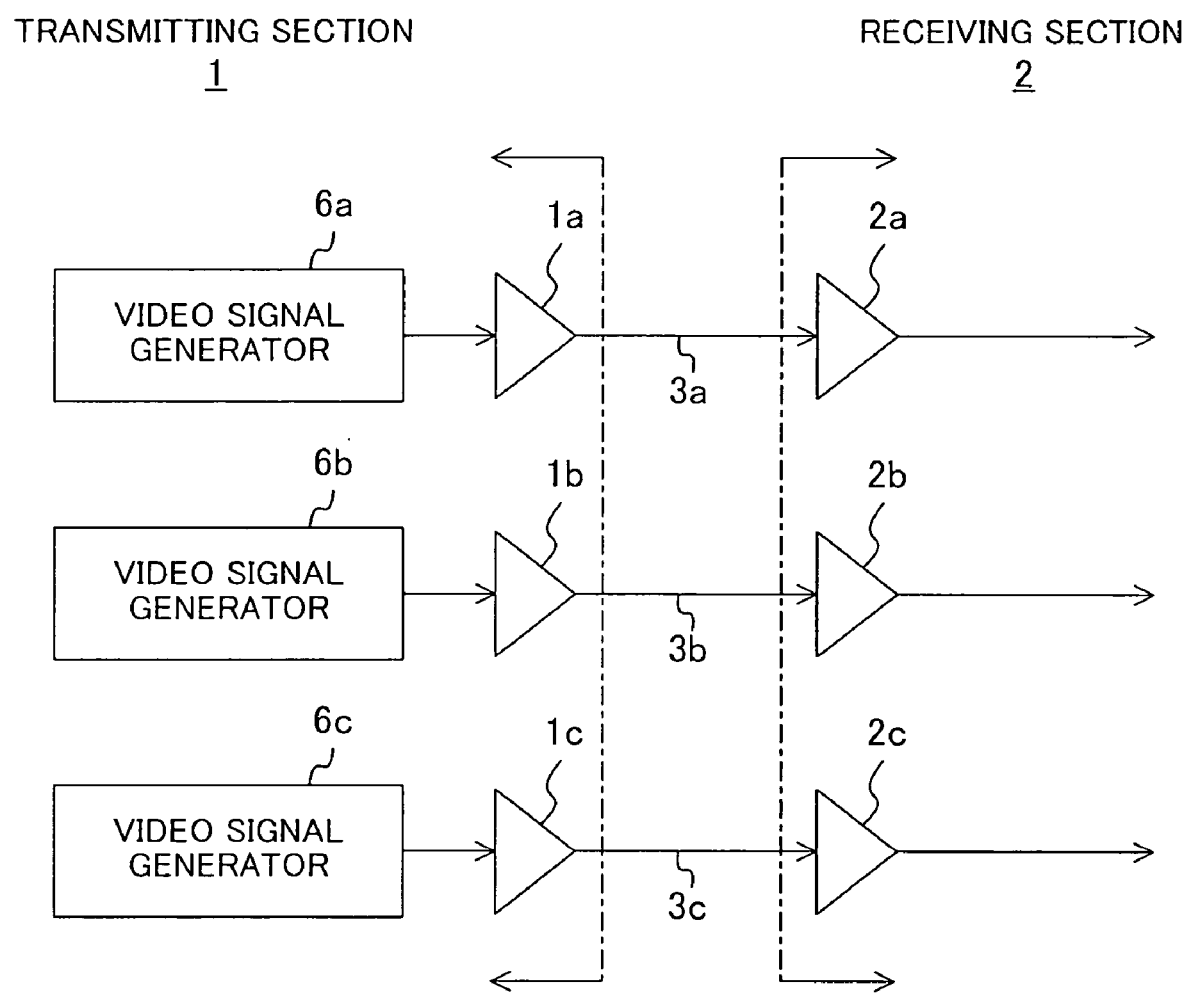
FIG. 5 is a block diagram showing a conventional video signal transmitting/receiving system.

FIGS. 4A and 4B are timing charts showing video signals in an RGB transmission mode using three channels. FIG. 4A shows an example in which a skew corresponding to one clock cycle of a video clock signal occurs on a transmission channel 1. The effective video region detector 12 detects the boundary between a control signal CS and a pixel signal B0, G0 or R0 for each transmission channel and controls selectors 10a through 10c such that the ends of the control signals CS or the beginnings of the effective video regions are synchronized with each other among three transmission channels. Specifically, in the example shown in FIG. 4A, the effective video region detector 12 controls the selectors 10a through 10c such that a video signal delayed by one clock cycle through the delay path 9a is selected on the transmission channel 0, a video signal transmitted through the signal path 7b without a delay is selected on the transmission channel 1 and a video signal delayed by one clock cycle through the delay path 9c is selected on the transmission channel 2.

As a result, as shown in FIG. 4B, the receiving section B outputs video signals obtained by delaying video signals transmitted from the transmitting section A by one clock cycle as a whole. Accordingly, all the pixel data for "B1", "G1" and "R1" in a pixel 1, for example, are synchronized with each other, so that correct luminance data is displayed.

Embodiment 3

Now, a video signal transmitting/receiving system according to a third embodiment of the present invention will be described.

Figure 8:
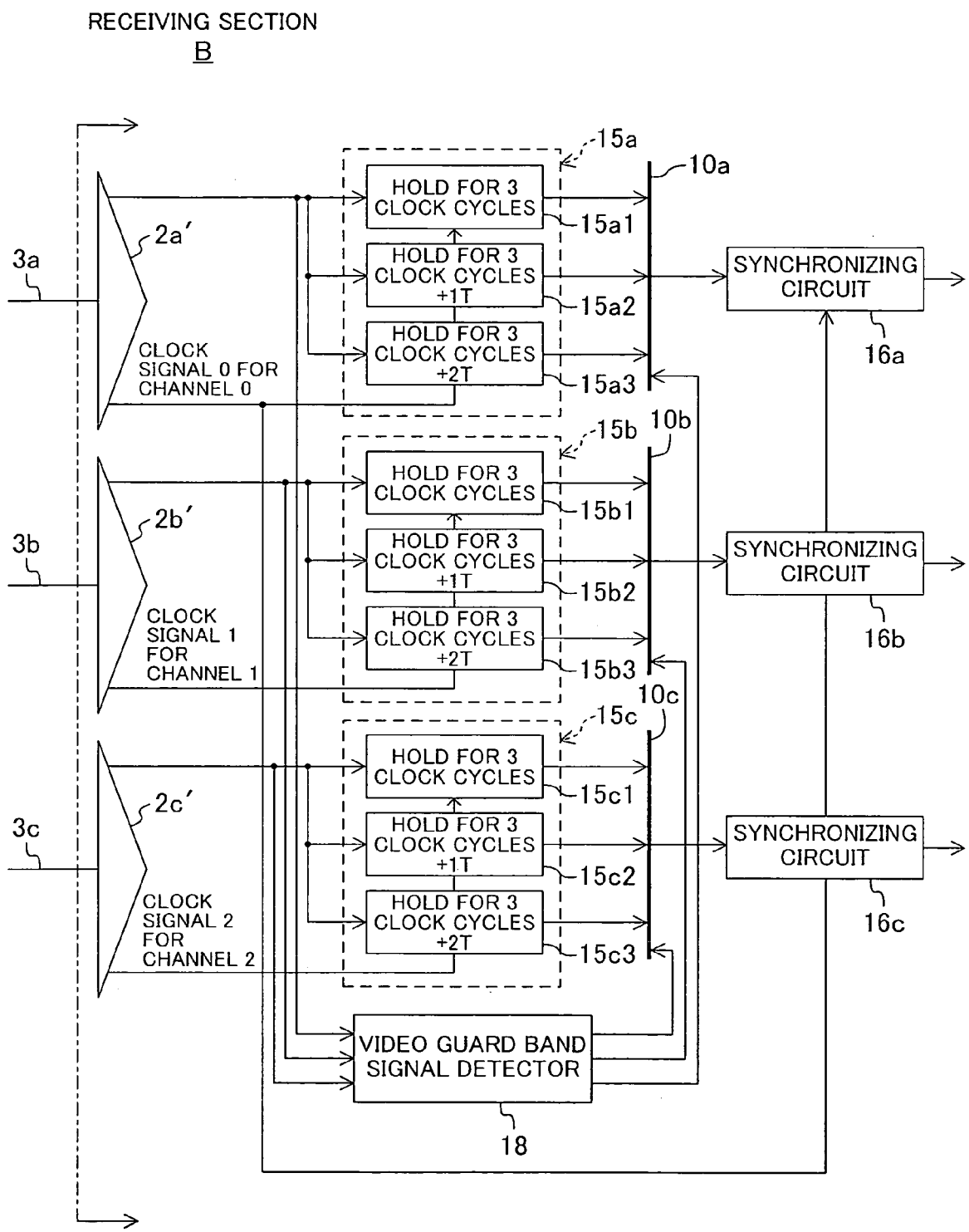
FIG. 8 is a block diagram showing an internal configuration of a video signal transmitting/receiving system according to a third embodiment of the present invention.

FIG. 8 shows a receiving section B included in the video signal transmitting/receiving system of this embodiment. In FIG. 8, the configuration of a transmitting section A is the same as that in the first embodiment shown in FIG. 1. The receiving section B shown in FIG. 8 ensures synchronization of video signals associated with three transmission channels even when a skew exceeding one clock cycle occurs among these video signals.

Figure 9:
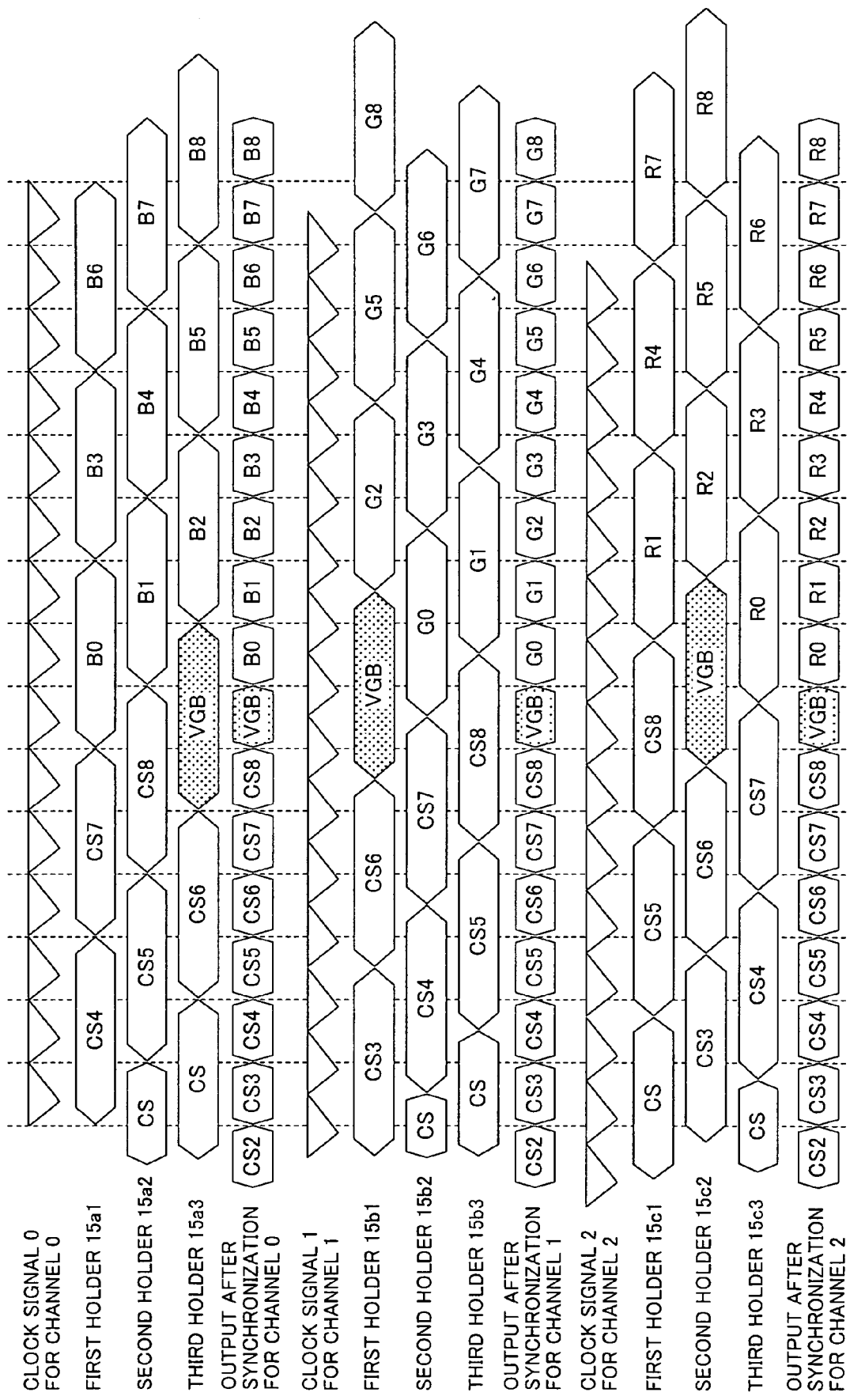
FIG. 9 is a timing chart showing video signals associated with respective transmission channels in a case where an RGB transmission mode using three channels is adopted in the video signal transmitting/receiving system.

In the receiving section B shown in FIG. 8, receivers 2a' through 2c' generate clock signals from video signals received through signal lines 3a through 3c respectively associated with the same transmission channels as the receivers 2a' through 2c', and output the video signals and the clock signals. These clock signals associated with the respective transmission channels are independent of each other. As shown in FIG. 9, a clock signal and a video signal associated with the same transmission channel are synchronized with each other, but clock signals associated with the respective transmission channels have different phases and are asynchronous to each other.

The receiving section B includes holding units 15a through 15c associated with the respective transmission channels 0 through 2. Each of the holding units 15a through 15c includes first through third holders (15a1 through 15a3) through (15c1 through 15c3.) As shown in FIG. 9, each of the first holders 15a1 through 15c1 repeatedly holds a received control signal CS or pixel signal for a given period corresponding to three clock cycles of a clock signal at each time. Each of the second holders 15a2 through 15c2 repeatedly holds, for the given period at each time, a control signal CS or pixel signal after one clock cycle (1T) subsequent to the control signal CS or pixel signal held by an associated one of the first holders 15a1 through 15c1. Each of the third holders 15a3 through 15c3 repeatedly holds, for the given period at each time, a control signal CS or pixel signal after one clock cycle subsequent to the control signal CS or pixel signal held by an associated one of the second holders 15a2 through 15c2 (i.e., after two clock cycles 2T subsequent to the control signal CS or pixel signal held by an associated one of the first holders 15a1 through 15c1.) A video-guard-band-signal detector 18 included in the receiving section B receives video signals from receivers 2a' through 2c' and selects selectors 10a through 10c in accordance with the phase relationship among three video guard band signals VGB respectively inserted into these video signals. For example, in the case shown in FIG. 9, the video-guard-band-signal detector 18 concurrently selects the third holder 15a3 holding the video guard band signal VGB on the transmission channel 0, the first holder 15b1 holding the video guard band signal VGB on the transmission channel 1, and the second holder 15c2 holding the video guard band signal VGB on the transmission channel 2. Then, after one clock cycle, the video-guard-band-signal detector 18 concurrently selects the first holder 15a1 on the transmission channel 0, the second holder 15b2 on the transmission channel 1, and the third holder 15c3 on the transmission channel 2. After the next one clock cycle, the video-guard-band-signal detector 18 concurrently selects the second holder 15a2 on the transmission channel 0, the third holder 15b3 on the transmission channel 1 and the first holder 15c1 on the transmission channel 2.

Video signals selected by the selectors 10a through 10c are input to synchronizing circuits 16a through 16c, respectively. Each of the synchronizing circuits 16a through 16c uses a clock signal associated with the transmission channel 0 as a synchronizing clock signal and takes a video signal from an associated one of the respective selectors 10a through 10c associated with the same transmission channel based on the synchronizing clock signal. As the synchronizing clock signal, a clock signal associated with another transmission channel 1 or 2 or a dedicated synchronizing clock signal may be used.

Accordingly, in this embodiment, as shown in FIG. 9, video signals output from the synchronizing circuits 16a through 16c and associated with the respective transmission channels 0 through 2 are synchronized with each other. For example, all the pixel data for "B0", "G0" and "R0" in a pixel 0, for example, are synchronized with each other, so that correct luminance data is displayed.

In this embodiment, the holding units 15a through 15c include the first through third holders (15a1 through 15a3) through (15c1 through 15c3) each for holding a control signal CS or a pixel signal for a given period corresponding to three clock cycles. Each of the first through third holders may, of course, hold a control signal or a pixel signal for a given period corresponding to four or more clock cycles.

In FIGS. 1 and 8, the video-guard-band-signal inserting circuits 5a through 5c and the video-guard-band-signal detectors 11 and 18 may operate at every one frame or every several frames of a video signal.

Embodiment 4

Figure 10:
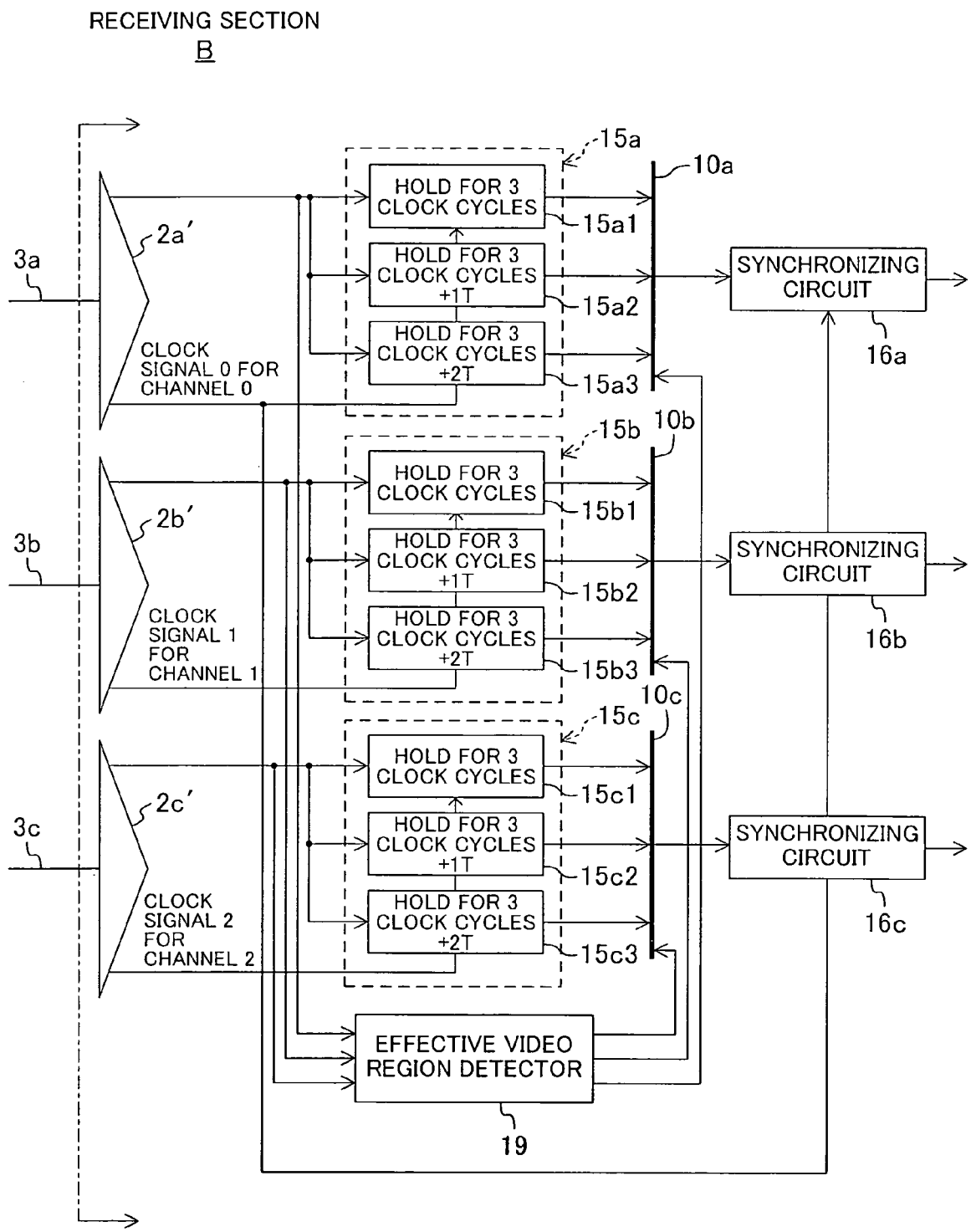
FIG. 10 is a block diagram showing an internal configuration of a video signal transmitting/receiving system according to a fourth embodiment of the present invention.

FIG. 10 shows a receiving section B for a video signal transmitting/receiving system according to a fourth embodiment of the present invention. A transmitting section for the video signal transmitting/receiving system of this embodiment has the same internal configuration as that of the transmitting section A shown in FIG. 3.

The receiving section B shown in FIG. 10 is different from that shown in FIG. 8 in that the video-guard-band-signal detector 18 included in the receiving section B shown in FIG. 8 is replaced with an effective video region detector 19. The configuration and operation of the effective video region detector 19 are easily understood on the analogy of the configurations shown in FIGS. 3 and 8 and description in the second and third embodiments, and thus the description of the effective video region detector 19 is omitted.

What is claimed is:

1. A video signal transmitting/receiving system in which a video signal region is made of an effective video region and a blanking region, the effective video region includes pixel signals, the blanking region includes control signals for display control, and the pixel signals and the control signals constitute a digital video signal, the video signal transmitting/receiving system transmitting and receiving the digital video signal via a plurality of transmission channels, the video signal transmitting/receiving system comprising:
   a transmitting section for transmitting the digital video signal;
   a receiving section for receiving the digital video signal; and
   a plurality of communication lines associated with the respective transmission channels and connecting the transmitting section and the receiving section to each other,
   wherein the transmission section includes video-guard-band-signal inserting circuits for inserting video guard band signals into the respective transmission channels immediately before transition from the blanking region to the effective video region,
   the receiving section includes, for each of the transmission channels,
      a signal path for outputting a received digital video signal without a delay, and
      a delay path for delaying the received digital video signal in synchronization with a clock signal,
   the receiving section further includes a video-guard-band-signal detector for detecting the video guard band signals inserted into the respective transmission channels by the video-guard-band-signal inserting circuits, and
   the video-guard-band-signal detector selects either the signal path or the delay path for each of the transmission channels, based on the detection of an associated one of the video guard band signals.

2. The system of claim 1, wherein the digital video signal conforms to an HDMI standard in which the control signals for display control and audio signals are included in the blanking region.

3. A video signal transmitting/receiving system in which a video signal region is made of an effective video region and a blanking region, the effective video region includes pixel signals, the blanking region includes control signals for display control, and the pixel signals and the control signals constitute a digital video signal, the video signal transmitting/receiving system transmitting and receiving the digital video signal via a plurality of transmission channels, the video signal transmitting/receiving system comprising:
   a transmitting section for transmitting the digital video signal;
   a receiving section for receiving the digital video signal; and
   a plurality of communication lines associated with the respective transmission channels and connecting the transmitting section and the receiving section to each other,
   wherein the receiving section includes, for each of the transmission channels,
      a signal path for outputting a received digital video signal without a delay, and
      a delay path for delaying the received digital video signal in synchronization with a clock signal,
   the receiving section further includes an effective video boundary detector for detecting a boundary of transition from the blanking region to the effective video region, for each of the transmission channels, and the effective video boundary detector selects either the signal path or the delay path for each of the transmission channels, based on the detection of the boundary.

4. The system of claim 3, wherein the digital video signal conforms to a DVI standard in which only the control signals for display control are included in the blanking region.

5. A video signal transmitting/receiving system in which a video signal region is made of an effective video region and a blanking region, the effective video region includes pixel signals, the blanking region includes control signals for display control, and the pixel signals and the control signals constitute a digital video signal, the video signal transmitting/receiving system transmitting and receiving the digital video signal via a plurality of transmission channels, the video signal transmitting/receiving system comprising:

a transmitting section for transmitting the digital video signal;

a receiving section for receiving the digital video signal; and a plurality of communication lines associated with the respective transmission channels and connecting the transmitting section and the receiving section to each other, wherein the transmission section includes video-guard-band-signal inserting circuits for inserting video guard band signals into the respective transmission channels immediately before transition from the blanking region to the effective video region, the receiving section includes, for each of the transmission channels, a first holder for holding a received control signal or pixel signal for a given period corresponding to at least three clock cycles, a second holder for holding, for the given period, a control signal or pixel signal subsequent to the control signal or pixel signal held by the first holder, and a third holder for holding, for the given period, a control signal or pixel signal subsequent to the control signal or pixel signal held by the second holder, the receiving section further includes a video-guard-band-signal detector for detecting the video guard band signals inserted into the respective transmission channels by the video-guard-band-signal inserting circuits, and the video-guard-band-signal detector selects one of the first, second and third holders for each of the transmission channels, based on the detection of an associated one of the video guard band signals.

6. The system of claim 5, wherein the digital video signal conforms to an HDMI standard in which the control signals for display control and audio signals are included in the blanking region.

7. A video signal transmitting/receiving system in which a video signal region is made of an effective video region and a blanking region, the effective video region includes pixel signals, the blanking region includes control signals for display control, and the pixel signals and the control signals constitute a digital video signal, the video signal transmitting/receiving system transmitting and receiving the digital video signal via a plurality of transmission channels, the video signal transmitting/receiving system comprising:

a transmitting section for transmitting the digital video signal;

a receiving section for receiving the digital video signal; and a plurality of communication lines associated with the respective transmission channels and connecting the transmitting section and the receiving section to each other, wherein the receiving section includes, for each of the transmission channels, a first holder for holding a received control signal or pixel signal for a given period corresponding to at least three clock cycles, a second holder for holding, for the given period, a control signal or pixel signal subsequent to the control signal or pixel signal held by the first holder, and a third holder for holding, for the given period, a control signal or pixel signal subsequent to the control signal or pixel signal held by the second holder, the receiving section further includes an effective video boundary detector for detecting a boundary of transition from the blanking region to the effective video region for each of the transmission channels, and the effective video boundary detector selects one of the first, second and third holders for each of the transmission channels, based on the detection of the boundary.

8. The system of claim 7, wherein the digital video signal conforms to a DVI standard in which only the control signals for display control are included in the blanking region.

* * * * *